INVENTORS
PAUL D. WEBB
DAVID C. LASHER

United States Patent Office 3,556,697
Patented Jan. 19, 1971

3,556,697
SEALING ARRANGEMENT FOR VACUUM PUMP
Paul D. Webb, Tioga, Pa., and David C. Lasher, Canadaigua, N.Y., assignors to Ingersoll-Rand Company, New York, N.Y., a corporation of New Jersey
Filed Apr. 10, 1969, Ser. No. 814,953
Int. Cl. F04c 27/00
U.S. Cl. 418—98                                                8 Claims

ABSTRACT OF THE DISCLOSURE

A sealing arrangement for a vacuum pump having the end portions of the shaft extending through the end walls of a pump housing, each shaft end portion provided with spaced labyrinth seals, and a conduit to conduct sealing liquid to between the seals of each shaft end portion. The subatmospheric pressure produced at both shaft end portions draws sealing liquid through the associated seals into the pump housing. The subatmospheric pressure in an intermediate portion of the pump housing is also utilized to draw sealing liquid through the seals and into the pump housing.

---

The invention relates to vacuum pumps, and more in particular to a sealing arrangement for such pumps.

In commonly known rotary type vacuum pumps, the rotary shaft is sealed for protection of the bearings, and more particularly to prevent leakage of air along the shaft into the pump compartment. The seals used for the latter are usually contact seals of the type with which sealing is dependent on rubbing contact between one or more rotating members and a stationary member, and cooling, including a coolant pump, is required to remove the frictional heat generated by such rubbing contact. These seals are usually of complicated design and power consuming, and since they are subject to substantial wear, frequent inspections and maintenance operations thereon are required.

It is then an object of the invention to provide a novel sealing arrangement for effectively sealing along the shaft of the pump.

Another object is to provide a novel sealing arrangement which is dependable.

Yet another object is to provide a novel sealing arrangement which is simple and economical.

Another object is to provide a novel sealing arrangement with minimal power consumption.

In general, these objects are achieved by the provision of a novel sealing arrangement for a vacuum pump comprising a relatively close clearance seal for the shaft of the vacuum pump, and conducting means communicating the seal with a supply of sealing liquid so that the subatmospheric pressure interiorly of the pump housing causes sealing liquid to be drawn through the seal and into the pump housing to prevent air from entering the housing through the seal.

The invention will be more fully understood from the following description when considered in connection with the accompanying drawings in which.

Figure 1:
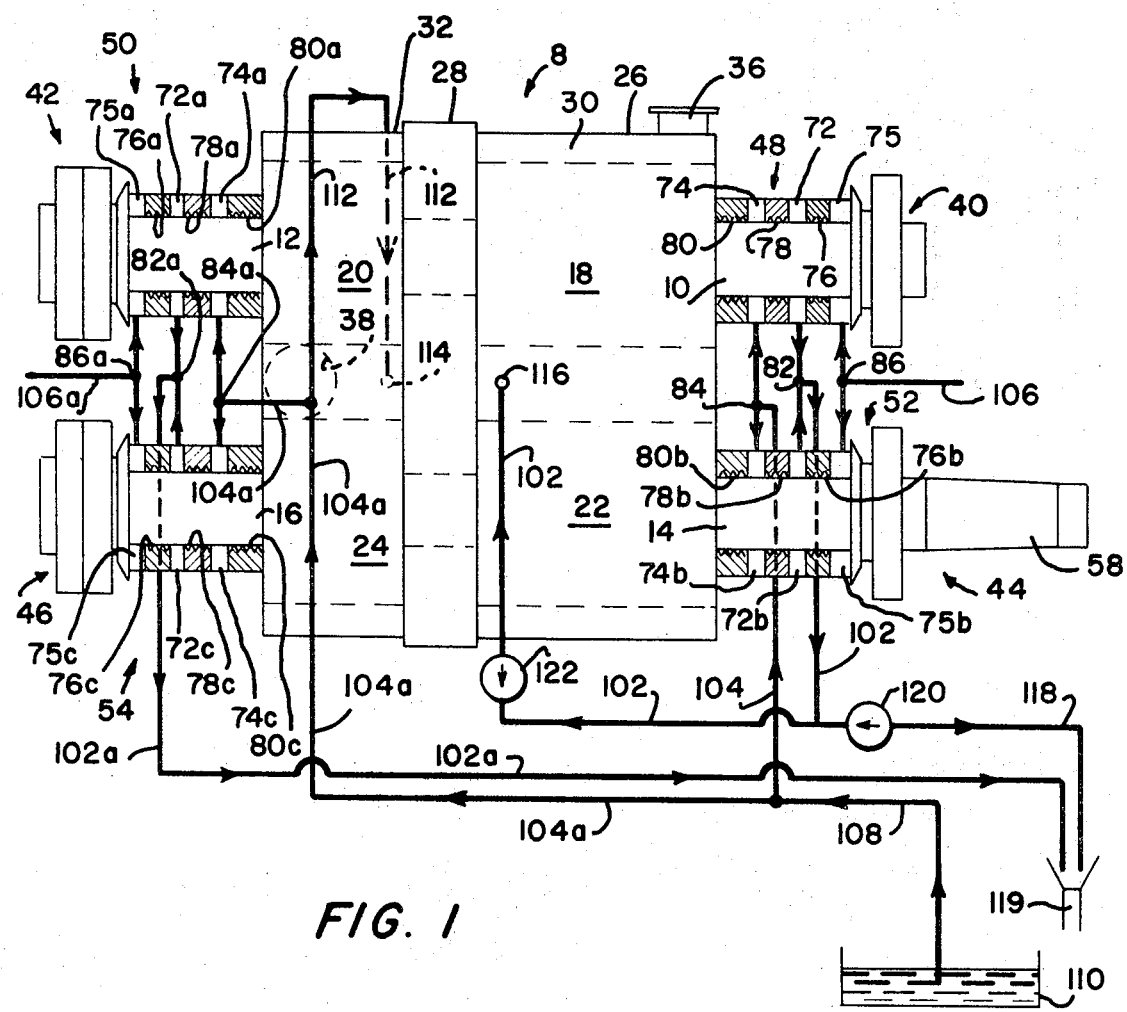
FIG. 1 is a diagrammatical view of the sealing arrangement applied to a vacuum pump.

The novel sealing arrangement according to the invention is shown as applied to a two-stage vacuum pump, designated numeral 8, of the helical rotor type for the evacuation of fluid including air, various gases, and vapors from a container, such as a condenser. However, it will be apparent from the following description that the invention is also applicable to other types of rotary pumps wherever a seal for a rotary shaft is desired and for evacuation of containers other than condensers. As shown diagrammatically in FIG. 1, the novel sealing arrangement is applied to the opposite end portions of the shafts of the male and female helical rotors of the vacuum pump 8, numerals 10, 12, 14 and 16 designating these shaft portions forming axial extensions of rotors 18, 20, 22 and 24, respectively. The aforementioned rotors are disposed in a housing 26 having an intermediate partition 28 dividing the interior of housing 26 into two pump compartments 30 and 32 defining the first and second stages in which the fluid is compressed. Partition 28 is provided interiorly with a passage 34 through which the fluid is conducted from the first into the second stage of compression. Housing 26 is provided with an inlet port 36 through which the fluid to be compressed is conducted into compartment 30 for the first stage of compression, and a discharge port 38 from which the fluid, after its second stage of compression in compartment 32, is discharged.

Figure 3:
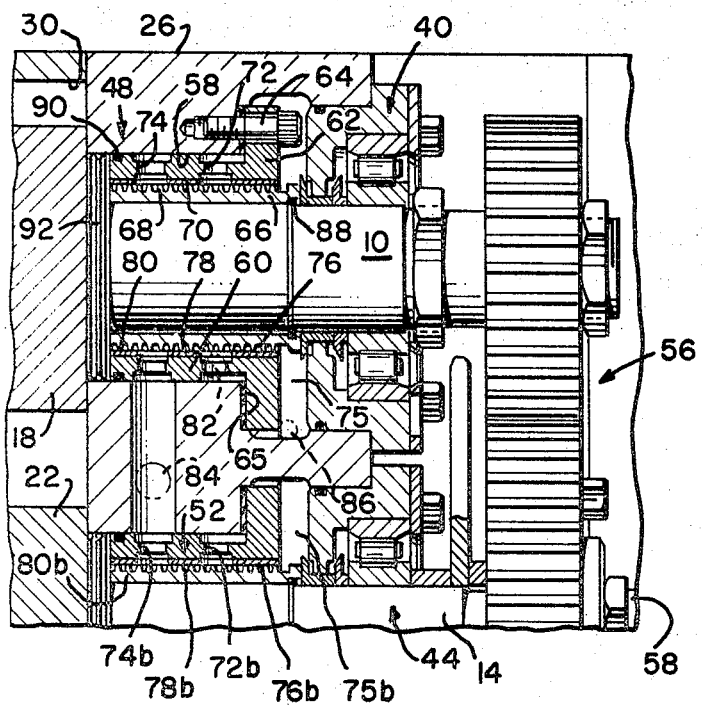
FIG. 3 is a cross-sectional view of a portion of the sealing arrangement.

The outer ends of housing 26 include bearing chambers 40, 42, 44 and 46 accommodating the bearing assemblies, as shown in FIG. 1 and partly shown in detail in FIG. 3, for the support of the rotor shafts, while the novel sealing arrangements for the rotor shafts are housed in seal chambers 48, 50, 52 and 54, partly shown in detail in FIG. 3, located between the bearing chambers 40, 42, 44 and 46, and compression compartments 30 and 32 of housing 26. Adjacent the bearing assemblies in bearing chambers 40 and 44, outwardly thereof, are disposed the timing gears 56, partly shown in FIG. 3, which are adapted to rotate the helical rotors 18 and 20, and 22, and 24, gears 56 being driven by the shaft end 58 extending outwardly of the housing 26 from the end portion 14 of the shaft, not shown, supporting rotors 22 and 24, and connected to a suitable driver or motor, not shown. The bearing assemblies are so positioned relative to each other to maintain the proper clearances between the lobes and grooves of the rotors.

The novel sealing arrangements are applied to the end portions 10, 12, 14 and 16 of the shafts, not shown, on which the rotors 18 and 20, and 22 and 24 are mounted, and include four sealing arrangements, and since these four sealing arrangements are substantially identical in structure to each other, only one sealing arrangement, namely the sealing arrangement in seal chamber 48 related to shaft end portion 10 will be hereinafter described in detail, this description being applicable to the other sealing arrangements about shaft end portions 12, 14 and 16 in seal chambers 50, 52 and 54, respectively.

As shown in FIG. 3, seal chamber 48 is defined by a bore 58 formed adjacent compartment 30, bore 58 accommodating a seal bushing 60 having a flange 62 for mounting, by means of one or more screws 64, against movement relative to the seal chamber wall 65. The inner periphery of seal bushing 60 is radially spaced from the outer periphery of shaft end portion 10 and is provided with a lining 70 of babbitt or other suitable relatively soft metal, the purpose of which to be explained hereinafter. A sleeve 66, press fitted around shaft end portion 10 to rotate therewith, extends within and along the length of seal bushing 60 and is provided with a series of closely spaced circumferential grooves and ridges 68. Ridges 68 of sleeve 66 are formed to fit snugly in seal bushing 60, the ridges 68 being formed of a metal or material harder than the metal or material forming the lining 70 of sleeve 66. Engagement of the interior of the relatively soft metal lining 70 of bushing 60 with the relatively hard metal ridges 68 of sleeve 66 causes ridges 68 to cut into the babbitt lining to form a minimal or extremely close clearance between the exterior of ridges 68 of sleeve 66 and the babbit lining 70 interior of seal bushing 60.

As shown in FIG. 3, seal bushing 60 is provided with annular grooves or passages 72 and 74 interrupting the continuity of the inner periphery and lining of seal bushing 60 and dividing the area of close clearance between the babbitt lining 70 of seal bushing 60 and the ridges 68 of sleeve 66 into three smaller areas of close clearance defining three labyrinth seals 76, 78 and 80, passages 72 and 74 being positioned alternately therebetween. Passages 72 and 74 are in communication with the exterior of housing 26 by means of passages 82 and 84, respectively, and in addition, another passage, passage 86, is provided to form a free communication between the ambient air or atmosphere exterior of housing 26 with labyrinth seal 76. It is to be noted that labyrinth seal 76 is the outermost of the three labyrinth seals 76, 78 and 80, and is adjacent an open space 75 between the sealing arrangement in seal chamber 48 and the bearing assembly in bearing chamber 40, passage 86 communicating space 75 with the exterior of housing 26. The purpose of the arrangement of passages 72, 74, 86 and space 75 will be explained hereinafter.

The inner periphery of the outer end portion of sleeve 66 is provided with a slightly enlarged bore cooperating with the associated shaft portion to accommodate a seal in the form of an O-ring 88 so that the ambient air and that from passage 86 is prevented from passing through any clearance formed between the exterior of shaft end portion 10 and the inner periphery of sleeve 66 into the adjacent pump compartment. Another seal, in the form of an O-ring 90, is provided in a groove adjacent the inner end of sleeve 60 to prevent leakage of air along the outer periphery of sleeve 60 into the adjacent pump compartment.

Preferably, although not necessarily, an additional labyrinth seal 92 is provided to maintain a relatively close radial clearance between the outer ridges of the seal 92 and the associated portion of bore 58 of sealing chamber 48.

Since the sealing arrangement in seal chamber 48 related to shaft end portion 10, as shown in FIG. 3, is substantially identical to the sealing arrangements in seal chambers 50, 52 and 54, as stated hereinbefore, the numerals for identical components of the four sealing arrangements are identical, but for reasons of clarity, a suffix is added to the numerals for the components of the sealing arrangements in seal chambers 50, 52 and 54, these numerals bearing the suffixes a, b, and c, respectively, see FIG. 1.

As shown in FIG. 3, passage 74 between seals 80 and 78 about shaft end portion 10 is in communication with passage 74b between seals 80b and 78b about shaft end portion 14 by means of a duct communicating with passage 84. Passage 72 between seals 78 and 76 is in communication with passage 72b between seals 78b and 76b by means of a duct communicating with passage 82. This arrangement, at the inlet side of the pump, is similar to the arrangement at the discharge side of the pump, see FIG. 1. Passage 74a between seals 80a and 78a about shaft end portion 12 is in communication with passage 74c between seals 80c and 78c about shaft end portion 16 by means of a duct communicating with passage 84a, while passage 72a between seals 78a and 76a is in communication with passage 72c between seals 78c and 76c by means of a duct communicating with passage 82a.

Figure 2:
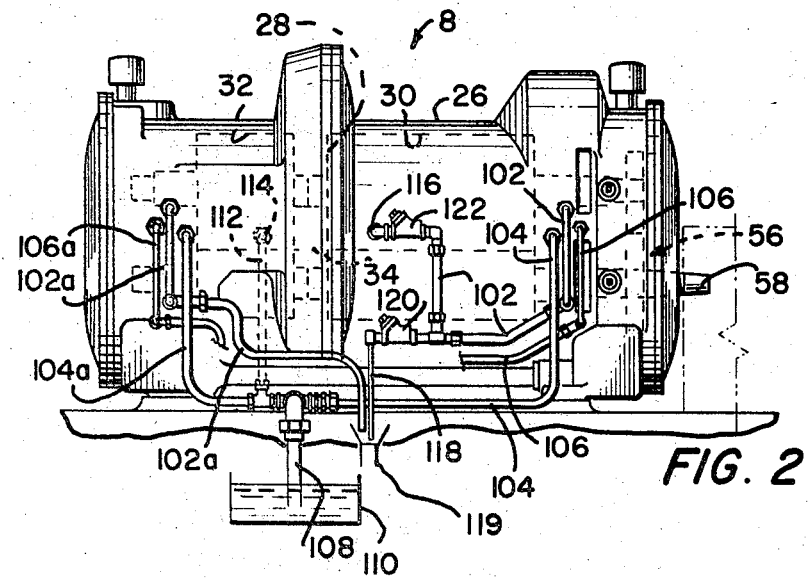
FIG. 2 is a side view of the vacuum pump showing the conduits and pipe connections for the sealing arrangement.

As shown in FIGS. 1 and 2, passages 84, 82 and 86 at the inlet side of the pump, and passages 84a, 82a and 86a at the discharge side of the pump, extend to the exterior of housing 26, and are connected to conduits 104, 102 and 106, and conduits 104a, 102a and 106a, respectively, see FIG. 2. As shown in FIGS. 1 and 2, passage 84 is connected to passage 84a by means of conduits 104 and 104a extending into conduit 108 communicating with a reservoir 110 containing a liquid sealant, preferably water. Conduit 104a extends also into a conduit 112 having a connection 114 with a passage, not shown, extending from the exterior into the interior of pump compartment 32 at the inlet end portion thereof adjacent partition 28 between pump compartments 30 and 32.

Passage 82 is connected to conduit 102 having a connection 116 with a passage, not shown, extending from the exterior to the interior of pump compartment 30 at the discharge end portion thereof adjacent partition 28. Conduit 102 is further connected to a conduit 118 extending into a drain 119. Conduit 118 is provided with a check valve 120 permitting flow from conduit 102 to drain 119 but preventing flow from conduit 118 into conduit 102. Conduit 102 is provided with a check valve 122, check valve 122 permitting flow from passage 82 to pipe connection 116 and the interior discharge end portion of pump compartment 30, but preventing a flow reverse thereof. The purpose of this arrangement will be explained hereinafter in detail. Passage 82a is connected to conduit 102a extending into drain 119, while passages 86 and 86a are connected to conduits 106 and 106a, respectively, both conduits communicating with the atmosphere.

Vacuum pump 8, having its inlet 36 connected to a container, such as a condenser, not shown, operates as follows.

As the rotors of the vacuum pump are rotated, the fluid to be evacuated from the condenser is drawn through the inlet 36 and enters the first stage pump compartment 30 where it is compressed and caused to flow from the first stage pump compartment 30 through passage 34 in partition 30 and into the second stage pump compartment 32. The fluid is then further compressed in pump compartment 32 and discharged through discharge port 38. Since a vacuum is produced by the rotors of the vacuum pump, this vacuum being about one inch of mercury absolute at the inlet 36, vacuum is also produced at the seals 80 and 80b adjacent the inlet end of pump compartment 30 causing sealing water to be drawn from reservoir 110 through conduits 108, 104, and passage 84 to flow through passages 74 and 74b and seals 80 and 80b into pump compartment 30.

Although the pressure at the discharge 38 of the vacuum pump is equal to atmospheric pressure, the pressure at that portion of the housing wall through which shaft end portions 12 and 16 extend is slightly below atmospheric pressure, causing a suction through seals 80a and 80c drawing sealing water from reservoir 110 through passages 74a and 74c, and passage 84a, conduits 104a and 108, to flow through seals 80a and 80c into the interior of pump compartment 32. The flow of sealing water through seals 80 and 80b at the inlet side of the pump, and seals 80a and 80c at the discharge side of the pump, prevents air from leaking into the associated ends of pump compartments 30 and 32. As the pressure at the inlet end of the interior of the second stage or pump compartment 32 is also below atmospheric pressure, a suction is created therein and pipe connection 114 causing sealing water to be drawn through conduit 112 extending from conduits 104a and 108 from reservoir 110 to flow through pipe connection 114 and into the interior of pump compartment 32.

The pressure at the discharge end of the interior of pump compartment 30 being also below atmospheric pressure, say two inches of mercury absolute, suction is created in pipe connection 116, conduit 102 and passages 82, 72 and 72b. Since the flow of sealing water through seals 80 and 80b is minimal due to the extremely close clearance of seals 80 and 80b, the suction created in passages 72 and 72b causes a portion of the sealing water in the adjacent passages 74 and 74b to be drawn through seals 78 and 78b to flow through passage 82, conduit 102, pipe connection 116 and into the discharge end of the interior of pump compartment 30. The suction created in passages 72 and 72b also causes air from the adjacent passages 75 and 75b being in communication with the atmosphere by means of passage 86 and conduit 106 to be drawn through seals 76 and 76b and conducted with the sealing water from the adjacent passages 72 and 72b through conduit 102 into the discharge end of the interior of pump compartment 30. The amount of air drawn through seals 76 and 76b and into the discharge end of the interior of pump compartment 30 is insignificant because of the extremely close clearance of seals 76 and 76b. It is to be noted that, due to the arrangement of check valves 120 and 122, check valve 120 is drawn closed while check valve 122 permits the flow of sealing water and air into the discharge end of the interior of pump compartment 30 to continue as long as suction is created therein. In case, however, the pressure at the discharge end of the interior of pump compartment 30 is above atmospheric pressure, check valve 122 prevents a reverse flow from the discharge end of the interior of pump compartment 30 to passages 72 and 72b and related seals, while check valve 120 will permit any leakage of water from passages 74 and 74b through seals 78 and 78b into passages 72 and 72b to be drained off by conduit 118.

Passages 72a and 72c are in communication with passage 82a, and any water leakage from the adjacent passages 74a and 74c through seals 78a and 78c is conducted through conduit 102a into drain 119 to be drained off.

With the foregoing arrangement, it is made possible to automatically seal off those seals in which a vacuum is produced to prevent air from entering the pump compartments 30 and 32 and dissipating the vacuum therein. This is achieved by the vacuum or suction produced by the pump, thus eliminating the use of pumps and other mechanical devices for additional sealing to supply the sealing liquid to the seals. The sealing liquid is conducted to the seals without any pressure head above atmospheric pressure, but solely by the subatmospheric pressure produced in the pump compartments.

For those seals in which no vacuum is produced, no additional sealing is required since the pressure within the associated pump compartment causes a flow outward of the seal rather than into the seal.

While a preferred embodiment of the invention is shown, it is to be understood that various changes may be made in its construction without departing from the scope of the invention as defined in the appended claims.

1. In a vacuum pump including a housing having an end wall, a bore in said end wall, a shaft extending through said bore, and means in said housing produce subatmospheric pressure therein;
 a seal formed between the inner periphery of said bore and the associated outer periphery of said shaft to minimize flow of air from the exterior of said housing through said seal and into the interior of said housing;
 a supply of sealing liquid; and
 conducting means communicating said supply of sealing liquid with said seal to permit said liquid to be drawn through said seal by said subatmospheric pressure in said housing preventing air from entering said housing through said seal; wherein
 said seal is in the form of a labyrinth seal including two concentric sleeves disposed in said bore, one of said sleeves mounted on said shaft and rotatable therewith, the other of said sleeves mounted in said bore to be stationary relative to said one of said sleeves, and one of said sleeves having its outer periphery ridged and formed of a material harder than the material of said other of said sleeves and spaced in close sealing relationship with said other of said sleeves.

2. The sealing arrangement according to claim 1 in which said ridged sleeve is mounted on said shaft, and the other sleeve is mounted in said bore.

3. The sealing arrangement of claim 2 in which said sleeve mounted in said bore includes an inner layer formed of a relatively soft material to permit grooves to be formed therein by said ridged sleeve.

4. In a vacuum pump including a housing having an end wall, a bore in said end wall, a shaft extending through said bore, and means in said housing to produce subatmospheric pressure therein;
 a sealing arrangement comprising a plurality of axially arranged seals formed between the inner periphery of said bore and the associated outer periphery of said shaft to minimize flow of air from the exterior of said housing through said seals and into the interior of said housing;
 said seals including a first seal adjacent the interior of said housing, a second seal axially spaced from said housing and adjacent said first seal, and a third seal axially adjacent said second seal, a first passage between said first and second seals, and a second passage between said second and third seals;
 a supply of sealing liquid;
 said first passage being in communication with said supply of sealing liquid to permit sealing liquid to be drawn through said first passage and said first seal into said housing by said subatmospheric pressure in said housing to prevent air from entering said housing;
 said second passage being in communication with a portion of the interior of said housing downstream of said end wall to permit a portion of said sealing liquid to be drawn from said first passage through said second seal into said second passage and into said portion of the interior of said housing downstream of said end wall by the subatmospheric pressure therein to prevent air from entering said first seal and said housing.

5. The sealing arrangement according to claim 4 in which said seals are in the form of labyrinth seals.

6. In a vacuum pump having a housing with axially spaced end walls, an inlet for said housing adjacent one of said end walls, and a discharge for said housing adjacent the other end wall, a bore in each end wall, a shaft extending through the bore in each end wall, and means within said housing to produce a subatmospheric pressure therein;
 a sealing arrangement for sealing against leakage of air along said shafts into said housing including a plurality of labyrinth seals formed in each of said bores to minimize flow from the exterior to the interior of said housing;
 each of said plurality of labyrinth seals including a first labyrinth seal adjacent the interior of said housing, a second labyrinth seal axially spaced from said housing and adjacent said first labyrinth seal, and a third labyrinth seal axially adjacent said second labyrinth seal, a first passage between said first and second seals, and a second passage between said second and third seals;
 a supply of sealing liquid;
 said first passages being in communication with each other and with said supply of sealing liquid to permit sealing liquid to be drawn through said first passages and said first seals into said housing by said subatmospheric pressure therein to prevent air from entering said housing;
 the second passage associated with the end wall at said inlet being in communication with a portion of the interior of said housing intermediate said end walls to permit a portion of said sealing liquid to be drawn from the adjacent first passage through the adjacent second seal into the last said second passage and into said portion of said housing intermediate said end walls by the subatmospheric pressure therein to prevent air from entering the associated first seal; and the second passage associated with the end wall at said discharge adapted to drain off sealing liquid flowing from the adjacent first passage through the adjacent second seal.

7. The sealing arrangement according to claim 6 in which said first passages are also in communication with another portion of the interior of said housing intermediate said end walls to permit sealing liquid to be drawn into the last said portion of the interior of said housing by the subatmospheric pressure therein.

8. The sealing arrangement according to claim 6 in which each third seal is in communication with the atmosphere to permit air to flow through said third seals and into said second passages.

References Cited
UNITED STATES PATENTS

| | | | |
|---|---|---|---|
| 1,986,706 | 1/1935 | Beyer | 103—111X |
| 2,448,717 | 9/1948 | Jeffcock | 277—53X |

ROBERT M. WALKER, Primary Examiner